Feb. 15, 1966 W. F. NIKLAS 3,235,737
FAST RESPONSE GAMMA-RAY IMAGE CONVERTER
Filed Aug. 1, 1961
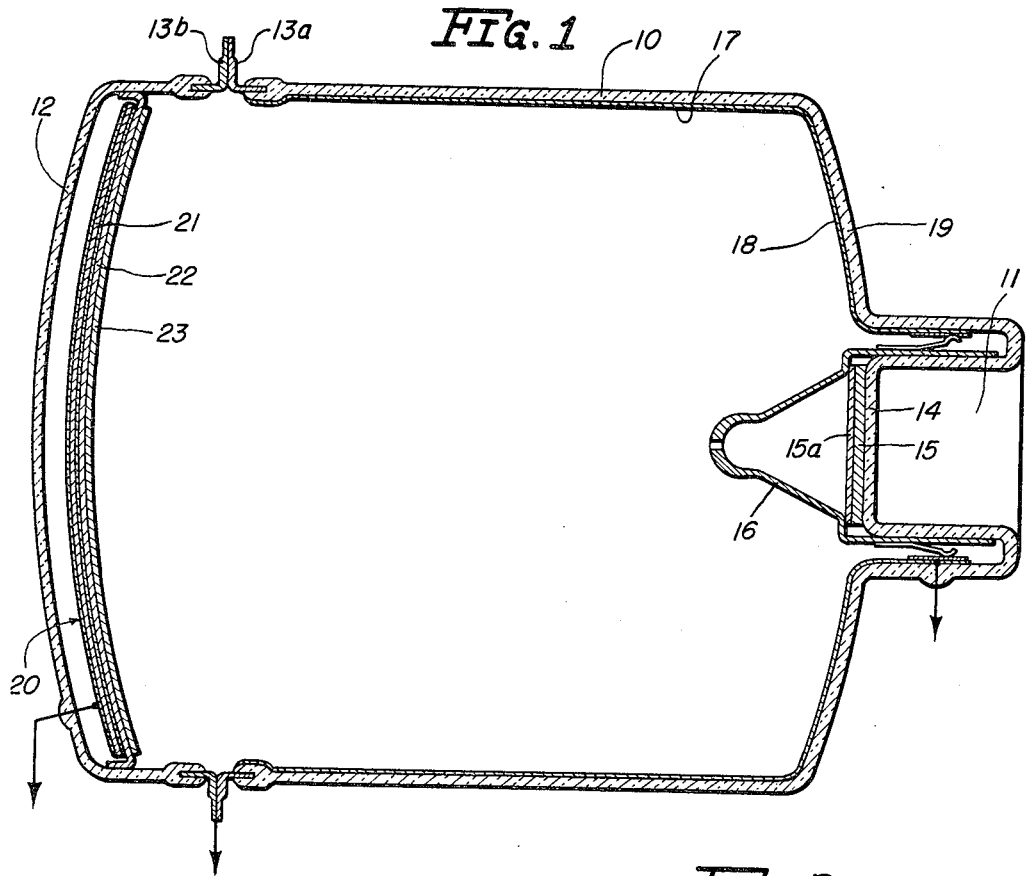
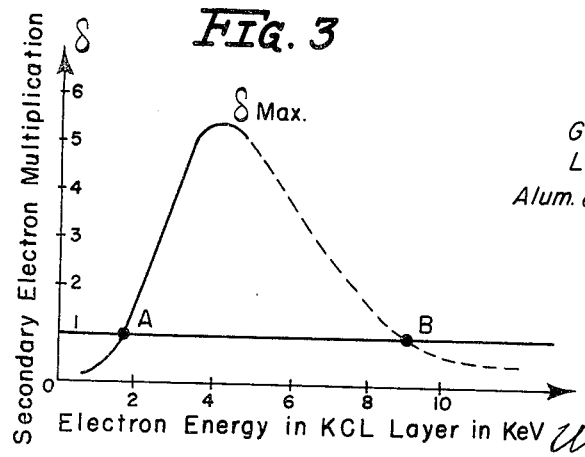
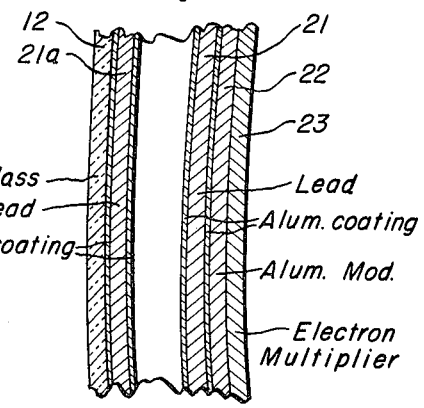
INVENTOR.
Wilfrid F. Niklas
BY
John J. Pederson
Atty.

United States Patent Office 3,235,737
Patented Feb. 15, 1966

3,235,737
FAST RESPONSE GAMMA-RAY
IMAGE CONVERTER
Wilfrid F. Niklas, Park Ridge, Ill., assignor to The
Rauland Corporation, a corporation of Illinois
Filed Aug. 1, 1961, Ser. No. 128,594
8 Claims. (Cl. 250—213)

The present invention relates to image converters and more particularly to gamma-ray image converters.

The technological advance of the aviation and space vehicle industries requires fast-response image converters for non-destructive testing, control and inspection for specific applications in the field of nuclear instrumentations utilizing electro-magnetic radiation in the energy bands of one mev. (million electric volts) and higher.

Due to the relatively low energy of X-rays, devices operating with X-rays may not be satisfactorily employed for this purpose; gamma-ray photography has been the only previously available technique. However, the use of gamma-rays in conjunction with photographic emulsions requires long exposure and developing time. Moreover, there are numerous physical environments of testing in which photographic processes are not feasible.

In liquid and solid fuel rocketry, the vitally important inspection of the finished rockets, utilizing previously available methods with gamma-rays and photographic film, was very complicated and time consuming. An instantaneous and continuous inspection system, if obtainable, would result in substantial advantages and economies.

Other potential applications are in the field of nuclear reactors for such purposes as to observe the flow of molten metal through pumps and pipes, inspection of castings and other metal objects, and in general for inspection purposes requiring a fast response of the image converters.

Gamma-ray image converters have been developed which are particularly suited for continuous or instantaneous inspection purposes in applications of the type mentioned above. Such image converters include a composite pick-up screen comprising a heavy metal target layer responsive to incident gamma radiation, a fluorescent layer for converting the incident radiation into visible light emission, a photo-cathode for converting the visible light emission into photo-electrons, and means for utilizing these photo-electrons to produce a visible image. Such devices are disclosed and claimed in the copending patent application of W. F. Niklas, Serial No. 117,051, filed June 14, 1961, and assigned to the same assignee as the present application.

The speed of response of this type of gamma-ray image converters is limited by the decay properties of the fluorescent material used in the pick-up screen. Fluorescent materials useable for this purpose are characterized by relatively long time constants, so that image converters of this type are not ideally suited for high speed nuclear instrumentation, or for displaying gamma-ray pulses of short duration and high duty cycle such as those obtained from high energy sources such as linear accelerators operating in the range of ten mev. or higher.

It is, therefore, a primary object of the present invention to provide a new fast-response gamma-ray image converter.

It is a further object of the present invention to provide a new and improved gamma-ray image converter which provides a substantially increased speed of response as compared with prior devices.

A gamma-ray image converter constructed in accordance with the present invention comprises, within an evacuated envelope, a composite pick-up screen comprising a heavy metal target element responsive to incident gamma-rays for developing free electrons at a predetermined energy level. A secondary emission multiplying element, of a material having a secondary emission multiplication factor greater than unity within a range of incident electron energy levels below the predetermined energy level, is in juxtaposition with the target element for developing secondary electrons in response to the transmission of incident electrons therethrough. Means including a metal moderating element are provided intermediate the target element and the multiplying layer for translating the free electrons developed by the target element to the multiplying layer as incident electrons at an energy level within the predetermined range. Means are further provided for utilizing the secondary electrons to produce a visible image.

The features of the present invention which are believed to be novel are set forth with particularity in the appended claims. The invention together with further objects and advantages thereof may best be understood, however, with reference to the following description taken in connection with the accompanying drawing, in the several figures of which like reference numerals identify like elements, and in which:

FIGURE 1 is a cross-sectional view of a gamma-ray image converter embodying this invention;

FIGURE 2 is an enlarged fragmentary cross-sectional view of a modified input section useful in the device of FIGURE 1; and FIGURE 3 is a graphical representation of an operating characteristic of the device of FIGURE 1.

The high speed image converter, represented in FIGURE 1, comprises a substantially cylindrical envelope section 10 which is preferably made of glass, although it may be constructed of metal or any other suitable material. The envelope section 10 has an end portion in the form of a re-entrant press 11, and the opposite end is provided with a face-plate section 12, which may be of spherical configuration and of a diameter approximately equal to that of the envelope section 10. Envelope sections 10 and 12 are presealed around their entire perimeters to respective metal flanges 13a and 13b which, in turn, are sealed together in known manner by heliarc welding or the like after the two envelope sections 10 and 12 have been separately processed.

The re-entrant section 11 is closed by a flat glass plate 14 on the inside of which a fluorescent viewing screen 15 of suitable fluorescent material is provided with a conductive metallic backing layer 15a which is sufficiently thin to be pervious to impinging electrons. An electron-optical system within the envelope causes electrons to impinge on screen 15 in order to snythesize a visible image thereon.

The electron-optical system of the image converter, disposed inside of the envelope, includes a large diameter photo-sensitive cathode structure 20 which is generally referred to in the art as a composite, multi-layer pick-up screen. This cathode structure is suitably spherical in configuration. It is positioned transversely of and substantially coaxial with the axis of the envelope which corresponds with the axis of an electron-optical path along which electrons, emitted from the cathode, are projected toward viewing screen 15. Such emitted electrons are accelerated and focused by an electrode system comprising a conductive wall coating 17 on envelope section 10, and an anode thimble 16 encompassing viewing screen 15; preferably a semi-conductive coating 18 is provided on shoulder portion 19 of the envelope, in the manner described and claimed in the copending application of Wilfrid F. Niklas, Serial No. 715,376, now abandoned, filed February 14, 1958, for Electron Discharge Device, which is assigned to the same assignee as the present application. The entire construction, with the exception of composite pick-up screen 20, may be identical with that employed in conventional image converters such as the Image Converter R–6175, produced and sold by The Rauland Corporation, Chicago, Illinois.

The composite pick-up screen comprises a target layer 21 of heavy metal, such as lead, tantalum, gold or uranium, but is preferably made of lead from 0.02 to 0.10 inch thick. Target layer 21 is deposited on a support plate 22 of aluminum, silver, molybdenum or similar metals, preferably aluminum, which also performs a moderating function in slowing down the electrons emanating from the lead layer 21. The thickness of the moderating layer 22 depends upon the energy of the electrons and thus upon the energy of the incident quanta and may be from 0.002 to 0.2 inch. An electron multiplying layer 23 is provided on the inner surface of support plate 22 and is responsive to incident primary radiation for emitting secondary electrons, representing an intensified electron image of the incident radiation, the density distribution in the emitted electron image being the counterpart of the gamma-rays initially received. The electron multiplying layer 23 may be approximately 1000 to 2000 Angstrom units thick and may consist of magnesium oxide, alkali-metal activated compounds such as antimony cesium, or metallic halides such as potassium chloride, magnesium fluoride, barium fluoride, or sodium aluminum fluoride; potassium chloride has been found to produce the maximum amplification and accordingly is preferred. In case an alkali-metal activated material is used as the electron multiplying layer, lead target layer 21 is preferably coated on both sides with evaporated aluminum to isolate the unavoidable surface lead oxide from the other components of the pick-up screen. Potassium chloride is particularly advantageous for use as the electron multiplying layer since it can be prepared outside of the vacuum vessel and can be subsequently inserted together with the other components of the pick-up screen 20 as a unit into the envelope.

In operation, when a gamma-ray image is directed onto the end-section 12 of the envelope, it impinges on lead target plate 21. The impinging high energy gamma-ray quanta cause a photo-electron and Compton electron emission, or pair production, depending upon the energy of the impinging quanta. In case of pair production, the produced positrons are immediately transformed into an electro-magnetic radiation and the more stable electrons remain at an energy level which is lower than that of the incident energy. The ratio of photo-electrons to Compton electrons at an energy level of one mev. is approximately 1:2 to 1:3. All of the produced radiation passes through the moderating aluminum layer 22. This moderating aluminum layer 22 slows down the electrons emerging from the lead layer 21 to increase the secondary emission yield of the potassium chloride electron multiplying layer 23.

FIGURE 3 shows the relation of secondary electron multiplication to primary electron energy in the potassium chloride electron multiplying layer 23. The electron multiplication curve rises rapidly with increasing primary electron energy to a maximum $\delta_{max}$ at approximately 4 to 5 kev. (thousand electron volts), crossing the $\delta=1$ line at a point A at about 2 kev.; beyond the maximum the curve falls gradually with further increase of the primary electron energy and crosses the $\delta=1$ line at a point B corresponding to incident energy of about 9 kev. In order to obtain electron multiplication in the potassium chloride layer 23 it is, therefore, necessary to reduce the primary electron energy impinging this layer 23 to values in the range between the points A and B on the $\delta=1$ line. As mentioned above, the thickness of the moderating aluminum layer is selected accordingly to slow down the primary electron energy to the desired magnitude.

The reduced-energy electrons emerging from aluminum layer 22 impinge from the rear upon the electron multiplying layer 23, giving rise to electron multiplication and a secondary electron emission from the opposite side of the layer 23.

It should be noted that the electrons emerging from the conversion lead layer 21 have velocities depending upon the nature of the incident radiation in such a manner that decreased wavelength of the incident quanta yield higher electron velocities. The thickness of the electron multiplying layer 23 should be sufficient to stop the electrons emerging from the lead layer 21 after same have passed through the moderating layer 22, and preferably should be empirically selected for any given device to produce a maximum number of secondary electrons. In practice, in a device adapted to respond to gamma radiation in the range of 1 mev. and higher, a potassium chloride layer 23 of a thickness of from 1000 to 2000 Angstrom units is sufficient to prevent most of the incident electrons from passing directly through without producing secondary electrons, yet is sufficiently thin to avoid any substantial retardation of the produced secondary electrons. The electron image formed by the secondary emission electrodes is, in an entirely conventional manner focused, accelerated and projected upon the viewing screen 15 and is converted at this juncture to a visible image which is viewable on the screen 15.

In accordance with another aspect of the present invention, a still further improvement in useful sensitivity may be achieved in certain environments, requiring exposure to gamma-rays of especially high energy. It is known that gamma-rays emitted by linear accelerators operating with electron energies in the ten mev. (million electron volt) range or higher, are not monochromatic. For example, a typical 35 mev. linear accelerator, having a tungsten target, emits gamma-rays of an average energy of 5–6 mev. with peaks reaching into 30 mev. range and an appreciable amount of "softer" radiation between 1 and 5 mev. The "hard" or high-energy, components of the gamma ray beam, give rise to spurious "softer" or lower-energy electro-magnetic radiation which in turn may yield, by multiple scattering, radiation below the 5 mev. band. This radiation, which does not carry any useful information, may nevertheless be picked up by the pick-up screen of the image converter, leading to an increase in noise-background and substantially reduced contrast of the output image.

In a further embodiment of the present invention, as illustrated in FIGURE 2, an additional target plate or "filtering" plate 21a is provided between the radiation source and the lead layer 21. Layer 21a also consists of a heavy metal such as lead, tantalum, gold or uranium, but preferably of lead, and when the electron multiplying layer 23 is of the alkali-metal activated type, this second lead layer 21a is also coated with evaporated aluminum to seal off the unavoidable surface oxide layers. The second layer 21a is advantageously disposed on the inner surface of the front plate 12 of the envelope 10. Filtering layer 21a is of sufficient thickness to selectively absorb all the "softer" radiation regardless of its origin, and thus substantially increases the contrast of the image. Lead plate 21a is preferably of the same thickness as the lead plate 21, namely 0.02 to 0.05 inch.

The energy conversion effects taking place in lead layers 21 and 21a have exceedingly short time constants. Moreover, the secondary electron emission taking place in electron multiplying layer 23 shows a very fast response; there is no phosphor component to introduce substantial delay in the conversion process. Gamma-ray image converters embodying the invention can, therefore, successfully be utilized for the reproduction of gamma-ray pulses in the micro-second range.

Thus the invention provides a new and improved gamma-ray image converter with virtually instantaneous response characteristics, rendering it especially useful for clear and precise presentation of very high speed phenomena which have not previously been subject to examination with gamma-ray devices.

While particular embodiments of the invention have been shown and described, it will be obvious to those

I claim:

1. A gamma-ray image converter comprising, within an evacuated envelope: a composite pick-up screen comprising a heavy metal target element responsive to incident gamma rays for developing free electrons at a predetermined energy level, a secondary emission multiplying element, of a material having a secondary emission ratio multiplication factor greater than unity within a range of incident electron energy levels below said predetermined energy level, in juxtaposition with said target element for developing secondary electrons in response to the transmission of incident electrons therethrough, and means including a metal moderating element intermediate said target element and said multiplying layer for translating said free electrons to said multiplying layer as incident electrons at an energy level within said range; and means for utilizing said secondary electrons to produce a visible image.

2. A gamma-ray image converter as defined in claim 1, in which said target plate is composed of one of the group of metals consisting of lead, tantalum, gold and uranium.

3. A gamma-ray image converter as defined in claim 1, in which said metal moderating element is an aluminum support plate, and said target element and said secondary emission multiplying element are formed as coatings on opposite sides of said support plate.

4. A gamma-ray image converter as defined in claim 1, in which said composite pick-up screen is in juxtaposition with an input window of said envelope, and said input window is internally coated with a heavy metal filtering element for selectively absorbing low-energy gamma irradiation.

5. A gamma-ray image converter according to claim 1 in which said target element is lead, said secondary emission multiplying element is potassium chloride, and said moderating element is aluminum.

6. A gamma-ray image converter as defined in claim 1, in which said secondary emission multiplying element is composed of an alkali-metal activated material, and said target element is clad with evaporated aluminum.

7. A gamma-ray image converter comprising, within an evacuated envelope: a composite pick-up screen comprising a heavy metal target element responsive to incident gamma rays for developing free electrons at a predetermined energy level, a secondary emission multiplying element, of a material having an optimum secondary emission ratio multiplication factor at an incident electron energy level below said predetermined energy level, in juxtaposition with said target element for developing secondary electrons in response to the transmission of incident electrons therethrough, and means including a metal moderating element intermediate said target element and said multiplying element for translating said free electrons to said multiplying element as incident electrons at an energy substantially corresponding to that at which said optimum secondary emission ratio multiplication factor is achieved; and means for utilizing said secondary electrons to produce a visible image.

8. A gamma-ray image converter according to claim 4 in which said target element and said filtering element are of lead, said secondary emission multiplying element is of potassium chloride, and said moderating element of aluminum.

References Cited by the Examiner
UNITED STATES PATENTS

| | | | |
|---|---|---|---|
| 2,666,864 | 1/1954 | Longini | 313—65 |
| 2,802,963 | 8/1957 | Sheldon | 250—213 X |
| 2,879,424 | 3/1959 | Garbuny et al. | 250—213 X |
| 2,928,969 | 3/1960 | Schneeberger | 313—65 |

RALPH G. NILSON, *Primary Examiner.*

WALTER STOLWEIN, *Examiner.*